(No Model.)
J. S. BEEMAN, W. TAYLOR & F. KING.
REGULATOR FOR DYNAMO ELECTRIC MACHINES.
No. 288,963. Patented Nov. 20, 1883.
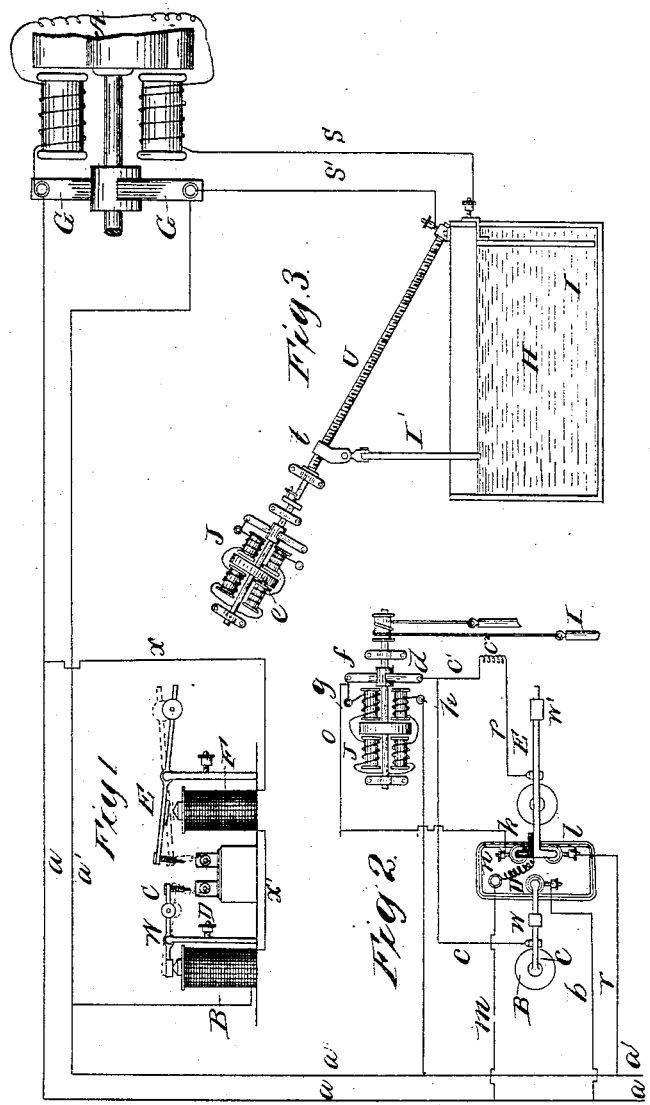
WITNESSES
Chas. R. Burr
W. E. Bowen.
INVENTORS:
J. S. Beeman, Wm. Taylor & Frank King
by Marcellus Bailey
Attorney

UNITED STATES PATENT OFFICE.

JOSEPH S. BEEMAN, WILLIAM TAYLOR, AND FRANK KING, OF LONDON, ENGLAND.

REGULATOR FOR DYNAMO-ELECTRIC MACHINES.

SPECIFICATION forming part of Letters Patent No. 288,963, dated November 20, 1883.

Application filed April 23, 1883. (No model.) Patented in England September 21, 1882, No. 4,503.

*To all whom it may concern:*

Be it known that we, JOSEPH SAMUEL BEEMAN, WILLIAM TAYLOR, and FRANK KING, of 67 Strand, London, England, have invented new and useful Improvements in Governors for Electric Currents, (for which we have obtained patent in Great Britain, dated September 21, A. D. 1882, No. 4,503,) of which the following is a specification.

The apparatus for regulating or governing electric currents relates to a suitable trough containing any electrolyte, two or more conducting-plates, both or all movable, or one set stationary, the other movable, all or any placed in a vertical, horizontal, or other direction. The plates, which may be solid, perforated, or built up, are to be moved and retained by suitable means in the desired position in the said trough, in which the electrolyte is maintained at a constant level, and convenient appurtenances used for retaining the plates in such desired position therein, so that by bringing the plates or sets of plates nearer to each other, or removing them a greater distance or immersing them more or less in the electrolyte, substantially in the manner hereinafter described, the current passed through the electrolyte by means of the plate or sets of plates is controlled and governed. The means employed by us for moving and retaining said plates are such as are hereinafter mentioned—viz., either by a rod or rods attached to the plate or sets thereof, worked in a stuffing-box or by a rack and pinion, by springs, or by counterbalanced weights and pulleys, or by other equivalents, said appliances for moving being actuated automatically by a solenoid with sucking magnet and spring, or by an electro magnet or magnets, releasing one or more armatures, and thereby causing one or more electromotors to work the appliances.

The drawings, as a whole, show, in part diagrammatically, the several parts of the apparatus and their connections.

Figure 1 is an elevation of the automatic apparatus for detecting abnormal difference in potential between the poles of the generator or their attached conductors. Fig. 2 contains a plan view of the same apparatus, together with a plan view of a motor, representing one means for lifting and lowering the electrode I' from and into the liquid resistance. Fig. 3 represents an alternative means for moving the electrode.

The following description of the drawings illustrates the manner of performing the invention.

A represents a convenient generator. $a$ and $a'$ are the main conductors leading from generator. $s$ and $s'$ are the conductors leading from generator to a liquid resistance or bath containing electrolyte H. I and I' are the plates or electrodes belonging to the liquid resistance. J is an electric motor attached to plate or plates or electrode of liquid resistance by either of the methods shown at Fig. 2 or Fig. 3. That shown at Fig. 2 represents a drum fixed to axle of armature $e$ of electric motor J, carrying a plate, I', or plates, and its counterpoise by means of a cord. On the rotation of the armature $e$ of the motor J the plate or plates I' will rise or fall, in accordance with the direction in which the armature of the motor rotates. In Fig. 3 the armature-shaft of the motor is attached to a worm or screw, U, carrying a screwed sleeve, $t$, from which is suspended plate or plates I'. On rotation of the armature $e$ of the motor J in either direction the worm or screw U will rotate, and the plate or plates will rise or fall in the liquid, according to the direction of the rotation of the armature, having in this the advantage of causing the plate or plates or electrodes to approach each other, as well as immersing them in the electrolyte or liquid resistance, thereby making the apparatus more sensitive than where immersion is effected by the drum-and-cord method, as shown in Fig. 2.

Figure 1 is an elevation of the automatic apparatus for detecting any abnormal difference in potential between the poles G and G', or their attached conductors $a$ and $a'$; and Fig. 2 contains a plan view of the same, showing connections to electric motor J for adjusting the liquid resistance H to the requirements at any time existing.

B F are electro-magnets wound with fine wire having very high resistance, and connected to the main conductor $a$ through $x$, round F, thence along $x'$, round B, along $x^2$, to $a'$. C and E are levers having armatures attached.

Fig. 2, B and F are the electro-magnets. C and E are levers carrying armatures, said levers having attachments by which contact may be made with the mercury-cups D $k$ $l$.

The drawings, as a whole, show the apparatus in position when the difference of potential at the poles of the generator G and G' or the attached conductors $a$ and $a'$ is at its normal. When the difference of potential between the poles of the generator G and G' or the attached conductors $a$ and $a'$ falls below the normal, the electro-magnet B releases its armature attached to the lever C, and the weight W causes lever C to fall and make a circuit through the electric motor J. A current then passes from a main conductor, $a$, along wire $b$, to mercury-cup or equivalent, D, and lever C, and thence along wire $c$ to electromotor J, entering at the brush of motor $d$, passing through armature of motor $e$ to brush of motor $f$, thence to terminal $g$, through field-magnets of motor to terminal $h$, along wire $i$, to main conductor $a'$. The connections as above convert the electric motor J into a "series" motor, and the armature $e$ rotates in such a direction as will cause the immersion, as in Fig. 2, of the plate or plates, and, as in Fig. 3, the immersion and approach of said plates. This immersion of the plate having the effect of lessening the liquid resistance, more current will flow through the conductor on field-magnets of generator A, thereby causing a rise in the potential generated by the armature of the generator A. During the process of a rise in potential between the poles of the generator G and G' or their attached conductors $a$ and $a'$, and when the normal potential is reached, the armature attached to lever C will be attracted by the electro-magnet B and the circuit containing the motor will be broken at the mercury-cup D, leaving, by the cessation of the rotation of the armature $e$, the plate or plates I' in the required position. If, now, the difference of potential between the poles of the generator G and G' or attached conductors $a$ and $a'$ rise above the normal, not only will the armature attached to lever C remain attracted by the electro-magnet B, but the armature attached to the lever E will also be attracted to the electro-magnet F, and the attachments to the lever will make a circuit through the mercury-cups $k$ and $l$. A current will now flow from main conductor $a$, along wire $m$, to terminal $n$, along the helical coil thereto attached, to mercury-cup $k$, thence along $o$ to brush $f$ and terminals $g$ of electric motor J, thence into field-magnets and armature in parallel arc, to $d$ and $h$, thence from $h$, through $i$, to $a'$, and also from $d$, through $c'$, resistance $c^2$, along $p$, to the lever E, thence to mercury-cup $l$, along wire $r$, to $a'$. The connections have now converted the electric motor J into a shunt-motor, and the armature will rotate in the reverse direction, and thus raise the plate or plates I' in Fig. 2, or withdraw and raise the plate or plates I' in Fig. 3, and this operation, by increasing the liquid resistance, will lower the current passing into the conductor on the field-magnets of generator A, thereby lowering the potential generated by the armature until the difference of potential between G and G' or $a$ and $a'$ reaches the normal, when the armature attached to lever E will be released and the weight W' will raise the attachments to the lever E, and so break the contact with the mercury-cups $k$ $l$, leaving the motor stationary and the plates in the liquid resistance in the position required by the conditions. The electrolyte composing the liquid resistance is retained at a constant level. When the motor is connected as shunt, we insert a resistance at $c^2$, with the object of equalizing the amounts of current which the motor receives when connected either as series or "shunt." In place of the armature attached to the levers E and C, to be attracted by their electro-magnets F and B, F and B may be solenoids and the armatures lengthened to hang or be drawn in the solenoids.

We claim as our invention—

In apparatus for governing electric currents, the combination of a bath or resistance containing conducting-plates or electrodes and solenoids or magnets and armatures, and also an electric motor, so arranged and connected with the electric generator as to regulate the relative position of the plates or electrodes for controlling and governing the electric current, substantially as hereinbefore described, and illustrated in the accompanying drawings.

In testimony whereof we have signed this specification in the presence of two subscribing witnesses.

J. S. BEEMAN.
W. TAYLOR.
FRANK KING.

Witnesses:
H. I. HADDAN,
A. E. MELHNISH.